United States Patent
Hubel et al.

(10) Patent No.: US 9,657,144 B2
(45) Date of Patent: *May 23, 2017

(54) POLYSILOXANE POLYETHER COPOLYMERS HAVING (POLYETHER)MOIETIES COMPRISING CARBONATE GROUPS AND THEIR USE AS STABILIZERS FOR THE PRODUCTION OF POLYURETHANE FOAMS

(75) Inventors: Roland Hubel, Essen (DE); Sarah Schmitz, Shanghai (CN); Michael Ferenz, Essen (DE)

(73) Assignee: EVONIK DEGUSSA GMBH, Essen (DE)

(*) Notice: Subject to any disclaimer, the term of this patent is extended or adjusted under 35 U.S.C. 154(b) by 494 days.

This patent is subject to a terminal disclaimer.

(21) Appl. No.: 13/566,640

(22) Filed: Aug. 3, 2012

(65) Prior Publication Data
US 2013/0035409 A1 Feb. 7, 2013

(30) Foreign Application Priority Data
Aug. 3, 2011 (DE) .................. 10 2011 109 547

(51) Int. Cl.
| C08G 77/46 | (2006.01) |
| C08G 18/48 | (2006.01) |
| C08G 18/76 | (2006.01) |
| C08G 18/44 | (2006.01) |
| C08L 83/12 | (2006.01) |
| C08G 101/00 | (2006.01) |

(52) U.S. Cl.
CPC ............ *C08G 77/46* (2013.01); *C08G 18/44* (2013.01); *C08G 18/4837* (2013.01); *C08G 18/7664* (2013.01); *C08G 2101/00* (2013.01); *C08L 83/12* (2013.01)

(58) Field of Classification Search
CPC .................................................. C08G 77/46
USPC ...................................................... 528/28, 30
See application file for complete search history.

(56) References Cited

U.S. PATENT DOCUMENTS

| 2,592,058 | A | 4/1952 | Muskat et al. | |
| 4,044,038 | A | 8/1977 | Rossmy | |
| 4,588,755 | A | 5/1986 | Kollmeier et al. | |
| 4,687,786 | A | 8/1987 | Kollmeier et al. | |
| 5,093,376 | A | 3/1992 | Mohring et al. | |
| 5,525,640 | A | 6/1996 | Gerkin et al. | |
| 5,633,292 | A | 5/1997 | Brune et al. | |
| 5,877,268 | A * | 3/1999 | Jorgenson et al. | 528/15 |
| 5,990,187 | A | 11/1999 | Boinowitz et al. | |
| 6,380,273 | B1 | 4/2002 | Eilbracht et al. | |
| 6,653,359 | B2 * | 11/2003 | Hilker et al. | 521/111 |
| 7,157,541 | B2 | 1/2007 | Knott et al. | |
| 7,196,153 | B2 | 3/2007 | Burkhart et al. | |
| 7,612,158 | B2 | 11/2009 | Burkhart et al. | |
| 7,671,103 | B2 | 3/2010 | Eilbracht et al. | |
| 7,838,566 | B2 | 11/2010 | Glos et al. | |
| 8,030,366 | B2 | 10/2011 | Ferenz et al. | |
| 8,802,744 | B2 * | 8/2014 | Knott et al. | 521/112 |
| 2003/0212158 | A1 | 11/2003 | Burkhart et al. | |
| 2006/0155090 | A1 | 7/2006 | Ferenz | |
| 2006/0178443 | A1 | 8/2006 | Boinowitz et al. | |
| 2007/0197678 | A1 | 8/2007 | Cavaleiro et al. | |
| 2009/0088489 | A1 | 4/2009 | Terheiden et al. | |
| 2009/0137751 | A1 | 5/2009 | Knott et al. | |
| 2010/0036011 | A1 | 2/2010 | De Gans et al. | |
| 2010/0056818 | A1 | 3/2010 | Ferenz et al. | |
| 2010/0105843 | A1 * | 4/2010 | Knott et al. | 525/474 |
| 2010/0113633 | A1 | 5/2010 | Henning et al. | |
| 2010/0249339 | A1 | 9/2010 | Henning et al. | |
| 2010/0286295 | A1 | 11/2010 | Heisler et al. | |
| 2011/0042004 | A1 | 2/2011 | Schubert et al. | |
| 2011/0046305 | A1 | 2/2011 | Schubert et al. | |
| 2011/0054055 | A1 | 3/2011 | Schmitz et al. | |
| 2011/0230619 | A1 | 9/2011 | Kuppert et al. | |
| 2011/0245412 | A1 * | 10/2011 | Schubert et al. | 524/588 |
| 2011/0251070 | A1 | 10/2011 | Poffenberger et al. | |
| 2012/0010302 | A1 | 1/2012 | Hartung et al. | |
| 2012/0029090 | A1 | 2/2012 | Brugger et al. | |
| 2012/0046486 | A1 | 2/2012 | Henning et al. | |
| 2012/0097883 | A1 | 4/2012 | Henning et al. | |
| 2012/0153210 | A1 | 6/2012 | Glos et al. | |

(Continued)

FOREIGN PATENT DOCUMENTS

| CN | 102617882 A | 8/2012 |
| DE | 3508292 | 6/1986 |

(Continued)

OTHER PUBLICATIONS

Kunststoff-Handbuch [Plastic handbook], vol. 7, Polyurethane[Polyurethanes], Carl-Hanser-Verlag, Munich, 1st edition 1966, 2nd edition, 1983 and 3rd edition, 1993.
European Search Report dated Oct. 31, 2012 received in a corresponding foreign application.
Chinese Office Action dated Jun. 3, 2015 received from Application No. 201210275226.3, together with an English-language translation.

*Primary Examiner* — Melissa Rioja
(74) *Attorney, Agent, or Firm* — Scully Scott Murphy and Presser

(57) ABSTRACT

The present invention relates to polysiloxane polyether copolymers which comprise at least one (polyether) moiety which comprises at least one unit —O—C(O)—O—, to a process for the production of the polysiloxane polyether copolymers, and also to the use of the polysiloxane polyether copolymers as stabilizers in the production of polyurethane foams, and also to polyurethane foams and items therefrom which are obtainable through the process.

6 Claims, No Drawings

(56) References Cited

U.S. PATENT DOCUMENTS

2012/0157558 A1    6/2012   Schiller et al.
2012/0190760 A1    7/2012   Henning et al.
2012/0190762 A1    7/2012   Hubel et al.

FOREIGN PATENT DOCUMENTS

| | | |
|---|---:|---:|
| DE | 4444898 | 10/1996 |
| DE | 19629161 | 1/1998 |
| DE | 102004001408 | 7/2005 |
| DE | 102005050473 | 4/2007 |
| DE | 102006042338 | 3/2008 |
| DE | 102007046860 | 4/2009 |
| DE | 102007055485 | 6/2009 |
| DE | 102007057145 | 6/2009 |
| DE | 102008043343 | 5/2010 |
| DE | 102010063237 | 6/2012 |
| DE | 102010063241 | 6/2012 |
| DE | 102011003148 | 7/2012 |
| DE | 102011003150 | 7/2012 |
| EP | 0152878 | 8/1985 |
| EP | 0409035 | 1/1991 |
| EP | 0532939 | 3/1993 |
| EP | 0798327 | 10/1997 |
| EP | 0867464 B1 | 9/1998 |
| EP | 0900811 | 3/1999 |
| EP | 1061095 | 12/2000 |
| EP | 1439200 | 7/2004 |
| EP | 1520870 | 4/2005 |
| EP | 1683831 | 7/2006 |
| EP | 2287226 | 2/2011 |
| WO | WO03091320 | 11/2003 |
| WO | WO2009065644 | 5/2009 |

\* cited by examiner

US 9,657,144 B2

POLYSILOXANE POLYETHER COPOLYMERS HAVING (POLYETHER)MOIETIES COMPRISING CARBONATE GROUPS AND THEIR USE AS STABILIZERS FOR THE PRODUCTION OF POLYURETHANE FOAMS

FIELD OF THE INVENTION

The present invention relates to polysiloxane polyether copolymers which comprise at least one (polyether) moiety and are characterized in that at least one (polyether) moiety is present which has at least one unit —O—C(O)—O—. The present invention also relates to a process for the production of such polysiloxane polyether copolymers, to the use of the polysiloxane polyether copolymers as foam stabilizers in the production of polyurethane foams, and also to items comprising or consisting of the foams.

BACKGROUND OF THE INVENTION

Various types of polyurethane are produced by polymerization of diisocyanates, such as 4,4'-methylenebis(phenyl isocyanate), abbreviated to MDI, or toluene 2,4-diisocyanate, abbreviated to TDI, with polyether polyols or with polyester polyols. The polyether polyols used in these processes are obtained through alkoxylation of polyhydroxy-functional starters (precursors), e.g., glycols, glycerol, trimethylolpropane, pentaerythritol, sorbitol or sucrose. Production of polyurethane foams uses additional blowing agents, e.g., pentane, methylene chloride, acetone or carbon dioxide. An indispensible factor for reproducible industrial production of foam (moldings) is stabilization of the polyurethane foam by a surfactant. The materials typically used, other than a few purely organic surfactants, are silicone surfactants, since such surfactants have a high capability for stabilization at interfaces.

A great number of different types of polyurethane foams are known, examples include flexible foam, high resilience foam, ester foam, rigid polyurethane (PU) foam and rigid polyisocyanurate (PI) foam. The stabilizers used in these processes have been developed specifically for the respective final application and usually exhibit significant performance difference when used in the production of other types of foam.

Recently, modified silicone surfactants, in particular polysiloxane polyether copolymers, have been developed for a very wide variety of types of foam. These polysiloxane polyethers differ in relation to the structure of the polyether moieties present.

DE 102004001408 describes the use of polyether siloxanes having a block structure as stabilizers in polyurethane foams. DE 10 2006 042 338 describes the use of polyethers comprising urethane groups or comprising urea groups for stabilizing polyurethane foams. DE 102008043343 describes silicone-polyether block copolymers with defined polydispersity in the polyoxyalkylene moiety and their use as stabilizers for the production of polyurethane foams. DE 102010063241 and DE 102010063237 describe silicone stabilizers for rigid polyurethane foams or for rigid polyisocyanurate foams. DE 102011003150 describes silicone-polyether block copolymers having high-molecular-weight polyether moieties and their use as stabilizers for the production of polyurethane foams. DE 102011003148 describes the use of silicone-polyether block copolymers having high-molecular-weight non-end-capped polyether moieties as stabilizers for the production of low-density polyurethane foams.

EP 0 900 811 describe the addition of cyclic organic carbonates in the production of polyurethane foam, in particular in formulations for flexible polyurethane-polyether foam.

EP 0 798 327 describes a process for the production of polycarbonate-co-polyetherdiols in the form of a two-stage process. In a first step, a polyether glycol is reacted with bisdimethylcarbonate in the presence of a basic catalyst to give a polyetherdiol bisdimethylcarbonate so as to permit conversion, in a subsequent second step, after distillative removal of the excess of dimethyl carbonate and removal of the basic catalyst, into a polycarbonate-co-polyetherdiol through an acid-catalyzed transesterification. One disadvantage of such a process is the work-up of the intermediate and the need to change the catalyst system.

U.S. Pat. No. 5,525,640 provides silicone-based wetting agents and their use in polyurethane foam blown by inert gases. In particular, the '640 patent discloses that a polyurethane foam subject to inert gas pressure can ideally be stabilized by a polyethersiloxane having a comb-type structure, where the ethylene oxide content in the polyether makes up less than 37% of the total alkylene oxide content. The teaching is supported by comparative foaming experiments in a mechanically produced foam system and also in a liquid-$CO_2$-blown foam system, using comb-type polyethersiloxanes entirely capped with acetoxy groups or with methyl groups. Alternative end groups disclosed, which cap the polyoxyalkylene branch, are —C(O)Z', —C(O)OZ" or —C(O)NHZ', where Z' comprises monofunctional alkyl or aryl groups of from 1 to 8 carbon atoms. No particular significance is attributed to these end groups, and this is also apparent from the fact that preference is given to the acetate end cap and the methyl end cap.

WO03/091320 discloses silicone-based wetting agents which are particularly suitable for providing flame retardancy to $CO_2$-blown polyurethane foam with fine cell structure. The teaching of U.S. Pat. No. 5,525,640 is utilized, and comb-type polyethersiloxanes are disclosed, the ethylene oxide content in the polyether in the comb-like polyethersiloxanes making up less than 37% of the total alkylene oxide content, where —C(O)Z', —CC(O)OZ' or —C(O)NHZ' are mentioned alongside the specifically disclosed end caps using acetate groups and methyl groups in the polyoxyalkylene moiety, where $Z^1$ comprises monofunctional alkyl or aryl groups of from 1 to 8 carbon atoms.

Similarly, U.S. Patent Application Publication No. 2010/0286295, which relates to silicone-based wetting agents for use in polyurethane foams derived from vegetable-oil polyetherols, discloses-silicone polyethers comprising alkyl groups. This publication also describes the possibility indicated in WO03/091320 of the organocarbonate end cap. Preference is again to use an acetate or methyl end cap in the '295 publication.

One area on which very high value is currently placed is environmentally friendly process technology. Increasing use is made of carbon dioxide ($CO_2$) as a blowing agent, in order to avoid the use of blowing agents such as methylene chloride or chlorofluorocarbons. There are many silicone stabilizers that are not suitable for the foaming process using $CO_2$ as a blowing agent.

SUMMARY OF THE INVENTION

In one embodiment, the present invention provides a stabilizer which can stabilize polyurethane foams and which gives a balanced property profile, in particular good processing latitude, fine cells, good gas yield, and good density distribution, in respect of the stabilization of polyurethane foams, and excellent compatibility with all of the known physical and chemical blowing agents, but in particular with $CO_2$ as a blowing agent.

Specifically, the present invention provides polysiloxane polyether copolymers which comprise at least one (polyether) moiety and which are characterized in that at least one (polyether) moiety is present which comprises at least one unit —O—C(O)—Y—, where Y is defined as below.

The present invention also provides a process for producing the polysiloxane polyether copolymers according to the invention, which is characterized in that a polyorganosiloxane having at least one SiZ function is reacted with at least one organic compound which has at least one carbonate function and at least one other group (differing from the carbonate group) capable of reaction with an SiH function.

The present invention further provides the use of the polysiloxane polyether copolymers according to the invention as foam stabilizers in a process for the production of polyurethane foam, and also the polyurethane foams thus produced, and also items comprising or consisting of the polyurethane foam according to the invention.

The polysiloxane polyether copolymers according to the invention have the advantage that when being used in the foaming processes it is possible, although not necessary, to avoid the use of physical blowing agents, e.g., methylene chloride or chlorofluorocarbons.

Another advantage of the use of the polysiloxane polyether copolymers (silicone-polyether block copolymers) (comprising carbonate structures) according to the invention is that excellent compatibility can be achieved with blowing agents, such as $CO_2$, and extremely good compatibility of blowing agent and stabilizer can be achieved. As a result, blowing agent nuclei have a less tendency towards coagulation, and it is therefore possible to achieve a very fine cell structure in the resultant polyurethane foams.

Another advantage of the polysiloxane polyether copolymers according to the invention and of their use is that, when other ingredients comprising carbonate structure are used in a foaming formulation, such as, for example, carbonate-containing polyols, it is possible to achieve increased phase compatibility in the polyol component of the polyurethane system and thus in comparison with the polyethersiloxanes used in the prior art and comprising polyethers which do not comprise carbonate.

Another advantage of the use of the inventive polysiloxane polyether copolymers is that in rigid foam applications it is also possible to obtain improved cell structure, lower cavity rate and reduced thermal conductivity when comparison is made with the polyethersiloxanes used as stabilizers according to the prior art and comprising polyethers.

DETAILED DESCRIPTION OF THE INVENTION

The polysiloxane polyether copolymers according to the invention, and their production, and also their use, are described by way of example below, but there is no intention that the invention is restricted to these examples of embodiments. Where ranges, general formulae or classes of compounds are mentioned below, these are intended to comprise not only the corresponding ranges or groups of compounds explicitly mentioned but also to comprise all subranges and subgroups of compounds which can result from extraction of individual values (ranges) or compounds. Where documents are cited for the purposes of the present description, the entire content of these is intended to be part of the disclosure of the present invention. Where percentages are stated, these are % by weight data unless otherwise stated. In the case of compositions, the % data are based on the entire composition unless otherwise stated. Where average values are stated below, these are number averages unless otherwise stated. Where parameters determined by measurements are mentioned below, the temperature and pressure at which the measurements were carried out are, unless otherwise stated, 23° C. and 101 325 Pa.

A feature of the polysiloxane polyether copolymers according to the invention, which comprise at least one (polyether) moiety, is that at least one (polyether) moiety is present which comprises a unit —O—C(O)—Y—, where Y=mutually independently $NR^Z$, O or S, preferably O, and $R^Z$=being identical or different, H or alkyl moiety, preferably H.

In one embodiment, the polysiloxane polyether copolymers according to the invention comply with formula (I):

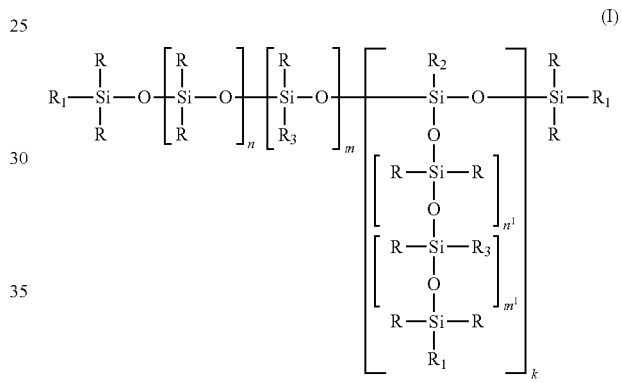

in which
n and $n^1$ are mutually independently from 0 to 500, preferably from 10 to 200, in particular from 15 to 100 and $(n+n^1) \leq 500$, preferably $\leq 200$, in particular from >0 to $\leq 100$, m and $m^1$ are mutually independently from 0 to 60, preferably from 0 to 30, in particular from 0.1 to 25 and $(m+m^1) \leq 60$, preferably $\leq 30$, in particular from >0 to $\leq 25$, k=0 to 50, preferably from 0 to 10, in particular from 0 or from 1 to 5, R=identical or non-identical moieties from the group consisting of linear, cyclic or branched, aliphatic or aromatic, saturated or unsaturated hydrocarbon moieties having from 1 to 20 carbon atoms

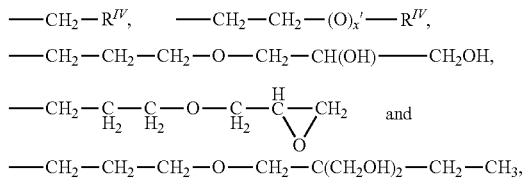

where
x' is 0 or 1 and
$R^{IV}$ is an optionally substituted hydrocarbon moiety optionally substituted with halogens and having from 1 to 50 carbon atoms, where R is preferably a methyl moiety, and where all of the moieties R are particularly preferably methyl moieties, $R_1$ is mutually independently R or $R_3$ or $R_7$, $R_2$ is mutually independently R or $R_3$ or $R_7$ or a functional, saturated or unsaturated, organic moiety substituted with heteroatoms and preferably selected from the group of the alkyl, chloroalkyl, chloroaryl, fluoroalkyl, cyanoalkyl, acryloxyaryl, acryloxyalkyl, methacryloxyalkyl, methacryloxypropyl or vinyl moieties, particularly preferably a methyl, chloropropyl, vinyl or methacryloxypropyl moiety, $R_3$, being identical or different, is -$Q_l$-X—($R_8$X—)$_w$—(CH$_2$—CH$_2$O—)$_x$—(CH$_2$—CH(R')O—)$_y$—(C(O)—Y)$_p$—R"

where l=0 or 1,

X=mutually independently NR$^Z$, O or S, preferably NR$^Z$ or O,

Y=mutually independently NR$^Z$, O or S, preferably O,

R$^Z$=being identical or different, H or alkyl moiety, preferably H,

Q=divalent hydrocarbon moiety having from 2 to 6 carbon atoms, and preferably Q=—CH$_2$—CH$_2$—CH$_2$— or —CH$_2$—CH$_2$—, $R_8$, being identical or different, is a branched or unbranched or cyclic, saturated or unsaturated hydrocarbon moiety having, between the heteroatoms X connected by the hydrocarbon moiety, a carbon chain comprising at least 2 carbon atoms, preferably a linear hydrocarbon moiety —C$_j$H$_{2j}$—, where j≥2, preferably j=4 to 12, and with preference j=from 6 to 10, w=0 to 200, preferably 1 to 150, with preference 3 to 20, x=0 to 200, preferably 5 to 140, with preference 10 to 100, y=0 to 200, preferably 5 to 140, with preference 10 to 100, p=0 to 100, preferably 1 to 20, with preference 2 to 10, where the units provided with the indices w, x, y and p can have blockwise or random arrangement, R'=identical or different alkyl or aryl group, unsubstituted or optionally substituted, for example with alkyl moieties, with aryl moieties or with haloalkyl moieties or with haloaryl moieties and having a total of from 1 to 12 carbon atoms, preferably a methyl, ethyl or butyl group, with preference a methyl group, and R"=being identical or different, a hydrogen moiety, an alkyl group having from 1 to 30 carbon atoms, a —C(O)—R'" group, where R'"=alkyl moiety, a —CH$_2$—O—R' group, an alkylaryl group, e.g. a benzyl group, a —C(O)—O—R"" group, where R""=alkyl moiety or alkylaryl, the —C(O)—OR' group, the —C(O)NH—R' group, or a bond to a silicon atom or to a moiety Q bonded to a silicon atom, where the silicon atom can be a constituent of the same polysiloxane skeleton of the formula (I) or of another polysiloxane skeleton of the formula (I), preferably an alkyl moiety, in particular methyl moiety, or an acetyl moiety, $R_7$=crosslinking agent moiety, as can be derived, for example, from unreacted or reacted diallyl compounds, with the proviso that at least one moiety $R_3$ is present in which the index p>0.

In some embodiments of the present invention, the polysiloxane polyether copolymer of formula (I) comprises no moiety $R^7$.

The polysiloxane polyether copolymers according to the invention of the formula (I) are typically not those in which one or preferably all of the moieties $R^3$ comply with the formula (IV)

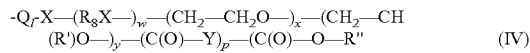
(IV)

where Q, j, $R_8$, w, x, y, Y, R' and p are as defined above and R'=alkyl, preferably having from 1 to 30 carbon atoms.

In some embodiments of the present invention, it can be advantageous if, in the moieties $R^3$, the units designated by the index p do not have direct connection to R".

The maximum molar mass, preferably the maximum average molar mass, of the polysiloxane polyether copolymers according to the invention, in particular those of the formula (I), is preferably smaller than 150 000 g/mol, more preferably smaller than 100 000 g/mol, and most preferably from 1000 to 80 000 g/mol. The molar mass can be determined by way of example by gel permeation chromatography (GPC).

The sum w+x+y+p is preferably ≥2, with preference from 6 to 100. The sum p+x+y is ≥2, preferably from 6 to 80. The sum p+x is ≥2, preferably from 3 to 50.

If there are, in the polysiloxane polyether copolymers according to the invention, not only moieties $R_3$ where p=0 but also those where p>0, the molar ratio of the moieties $R_3$ where p=0 to those moieties $R_3$ in which p>0 is preferably from 50:1 to 1:50, more preferably from 1:20 to 20:1.

Preferred polysiloxane polyether copolymers of formula (I) are those in which n and $n^1$ are mutually independently from 3 to 147 and (n+$n^1$)≤150, k is 0 or from 1 to 5, R=a methyl moiety, $R_1$=R or $R_3$, $R_2$=R or $R_3$ or a chloropropyl, vinyl or methacryloxypropyl moiety, and at least one moiety $R_3$, being identical or different, is -$Q_l$-X—($R_8$X—)$_w$—(CH$_2$—CH$_2$O—)$_x$—(CH$_2$—CH(R')O—)$_y$—(C(O)—Y)$_p$—R", where l=0 or Q=—CH$_2$—CH$_2$—CH$_2$— if l=1, $R_8$=a linear hydrocarbon moiety —C$_j$H$_{2j}$—, where j=4 to 12, w=0 or 1 to 100, x=0 or 5 to 140, y=0 or 5 to 140, with the proviso that the sum x+y≥5, p=from 1 to 10, R'=being identical or different, a phenyl, methyl or ethyl group, preferably a methyl group, and R" is a hydrogen moiety or a methyl, butyl or acetyl moiety, with the proviso that at least one moiety $R_3$ is present.

The various monomer units of the polyorganosiloxane chain and also of the polyoxyalkylene chain can have a block structure in relation to one another or can have a random distribution. The indices given in the formulae provided here, and the value ranges of the indices given, are therefore the average values for the possible statistical distribution of the actual individual structures and/or mixtures of these.

The average molar content of propylene oxide units in the polysiloxane polyether copolymers according to the invention is preferably greater than that of ethylene oxide units (y>x), and this gives the stabilizers good suitability in particular for the use of $CO_2$-containing blowing agents and/or of carbonate-containing and/or PO-rich polyols.

The polysiloxane polyether copolymers according to the invention can be produced in various ways. In one embodiment, the polysiloxane polyether copolymers according to the invention are produced by the process described below.

A feature of the process according to the invention for the production of polysiloxane polyether copolymers is that a polyorganosiloxane having at least one SiH function or one SiZ function, where Z=halogen, preferably Cl, is reacted with at least one organic compound which has at least one carbonate function and at least one other group (differing from the carbonate group) capable of reaction with an SiH function or with an SiZ function. In some embodiments, it can be advantageous if, alongside one or more organic compounds which have at least one carbonate function and at least one other group (differing from the carbonate group) capable of reaction with an SiH function or SiZ function, one or more polyethers are used which have no carbonate group, and which have at least one group capable of reaction with an SiH function or SiZ function, but preferably one OH group or one vinyl end group or one ethynyl end group.

The reaction can take place according to any of the processes known from the prior art. In one embodiment, the reaction can take the form of a noble-metal-catalyzed hydrosilylation as described, for example, in EP 1 520 870 A1. The reaction is typically carried out in such a way that a molar excess of SiH-reactive groups is present, preferably an excess of 15 to 50 mol % and particularly preferably an excess of 25 to 35 mol %, based on the SiH groups.

The polyorganosiloxanes used having at least one SiH function or SiZ function can be branched or linear polyorganosiloxanes having terminal and/or pendent SiH functions or SiZ functions, or a mixture of these polyorganosiloxanes. The process according to the invention preferably uses polyorganosiloxanes having terminal and/or pendent SiH functions or SiZ functions of formula (II)

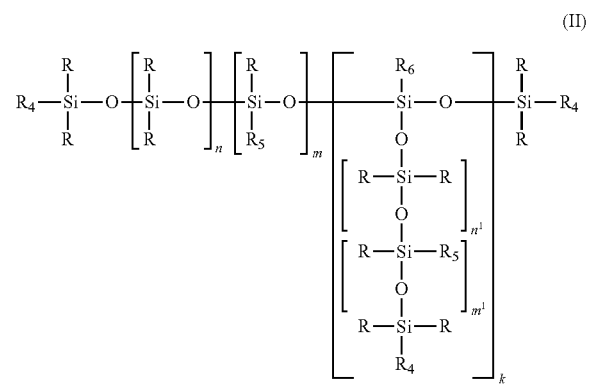

(II)

in which
n and $n^1$ are mutually independently from 0 to 500, preferably from 10 to 200, in particular from 15 to 100 and $(n+n^1) \leq 500$, preferably $\leq 200$, in particular from >0 to $\leq 100$,
m and $m^1$ are mutually independently from 0 to 60, preferably from 0 to 30, in particular from 0.1 to 25 and $(m+m^1) \leq 60$, preferably $\leq 30$, in particular from >0 to $\leq 25$,
k=0 to 50, preferably from 0 to 10 and in particular 0 or from 1 to 5,
R is as defined above,
$R_4$ is mutually independently hydrogen, Z or R,
$R_5$ is mutually independently hydrogen, Z or R,
$R_6$ is mutually independently hydrogen, Z, R or a functional, saturated or unsaturated, organic moiety substituted with heteroatoms and preferably selected from the group alkyl, chloroalkyl, chloroaryl, fluoroalkyl, cyanoalkyl, acryloxyaryl, acryloxyalkyl, methacryloxyalkyl, methacryloxypropyl or vinyl moieties, particularly preferably a methyl, chloropropyl, vinyl or methacryloxypropyl moiety,
with the proviso that at least one of the moieties $R_4$, $R_5$ and $R_6$ is hydrogen or Z, preferably hydrogen or Cl, with preference hydrogen.

In some embodiment, it is preferable that the polyorganosiloxane used having at least one SiH function or one SiZ function comprises polyorganosiloxanes having terminal and/or pendent SiH functions or SiZ functions, of the formula (II), where n and $n^1$ are mutually independently from 15 to 100 and $(n+n^1) \leq 100$, k is 0 or from 1 to 5, R=a methyl moiety, and $R_6$=R or a chloropropyl, vinyl or methacryloxypropyl moiety.

The polyorganosiloxanes having at least one SiH function, preferably the polyorganosiloxanes having terminal and/or pendent SiH functions of formula (II) can be produced as described in the prior art. See, for example, EP 1439200 B1 and DE 10 2007 055485 A1.

The polyorganosiloxanes having at least one SiZ function, in particular SiCl function, preferably the polyorganosiloxanes having terminal and/or pendent SiZ functions of the formula (II) can be produced as described in the prior art. See, for example, U.S. Pat. No. 4,044,038 and in literature cited in the '038 patent.

The organic compound which has at least one carbonate function and at least one other group capable of reaction with a SiH function preferably comprises a compound which comprises, as a group capable of reaction with a SiH function, an ethenyl end group or ethynyl end group. The organic compound which has at least one carbonate function and at least one other group capable of reaction with a SiH function preferably comprises a compound which has, as group capable of reaction with a SiH group, an ethenyl end group.

The organic compound which has at least one carbonate function and at least one other group capable of reaction with a SiZ function preferably comprises a compound which has, as a group capable of reaction with a SiZ function, a $HNR^Z$ group, a SH group or an OH group. In some embodiments, it is preferable that the organic compound which comprises at least one carbonate function and at least one other group capable of reaction with a SiZ function comprises a compound which has, as a group capable of reaction with a SiZ function, a primary OH group.

The organic compounds which have at least one carbonate function and at least one other group capable of reaction with a SiH function or SiZ function preferably comprise polyethers of the formula (III)

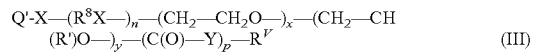

(III)

where Q'=H or preferably $CH_2$=CH—$(CH_2)_q$— or $CH \equiv C$—$(CH_2)_q$— and q=0 or 1, preferably 1, p=from 1 to 100, preferably from 1 to 10, $R^V$=being identical or different, a hydrogen moiety, an alkyl group having from 1 to 30 carbon atoms, a —C(O)—R''' group, where R'''=alkyl moiety, a —$CH_2$—O—R' group, an alkylaryl group, e.g. a benzyl group, a —C(O)—O—R'''' group, where R''''=alkyl moiety or alkylaryl, the —C(O)—OR' group, the —C(O)NH—R', or $CH_2$=CH—$(CH_2)_q$— or $CH \equiv C$—$(CH_2)_q$— group, and q=0 or 1, preferably 1, preferably an alkyl moiety, in particular methyl moiety, or acetyl moiety, and X, Y, w, x, y, $R_8$ and R' are as defined above. It is preferably that Q' in formula (III) is H or a vinyl group ($CH_2$=CH—) or allyl group ($CH_2$=CH—$CH_2$—), preferably an allyl group. In some embodiments, it is preferable that x+y in formula (III) is not equal to 0.

In some instances, it is preferable that the process according to the invention uses a polyether of formula (III) in which Q'=$CH_2$=CH—$CH_2$—, X and Y are respectively O, $R_8$=a linear hydrocarbon moiety —$C_jH_{2j}$—, where j=4 to 12, w=0 or 1 to 100, preferably 0, x=0 or 5 to 140, preferably 5 to 40, y=0 or 5 to 140, with the proviso that the sum x+y≥5, p=from 1 to 10, R'=a methyl or ethyl group, preferably a methyl group, and $R^V$ is a hydrogen moiety or a methyl, butyl or acetyl moiety.

In other instances, it is likewise preferable that the process according to the invention uses a polyether of formula (III) in which Q'=H, X and Y are respectively 0, $R_8$=a linear hydrocarbon moiety where j=4 to 12, w=0 or 1 to 100, preferably 0, x=0 or 5 to 140, preferably 5 to 40, y=0 or 5 to 140, with the proviso that the sum x+y≥5, p=from 1 to 10, R'=a methyl or ethyl group, preferably a methyl group, and Rv is a hydrogen moiety or a methyl, butyl or acetyl moiety.

Suitable organic compounds which have at least one carbonate function and at least one other group capable of reaction with a SiH function can be synthesized by way of example as stated in Example 1 or in analogous manner. Examples of possible other synthesis routes are by way of example also listed in U.S. Pat. No. 2,592,058.

Where the process according to the invention also uses polyethers which have no carbonate group, and have a vinyl end group or ethynyl end group, it is preferable to use those complying with formula (IV)

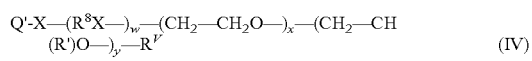
(IV)

where Q'=H or $CH_2=CH-(CH_2)_q-$ or $CH\equiv C-(CH_2)_q-$ and q=0 or 1, preferably 1, $R^V$=being identical or different, a hydrogen moiety, an alkyl group having from 1 to 30 carbon atoms, a —C(O)—R''' group, where R'''=alkyl moiety, a —CH$_2$—O—R' group, an alkylaryl group, e.g. a benzyl group, a —C(O)—O—R'' group, where R'''=alkyl moiety or alkylaryl, the —C(O)—OR' group, the —C(O)NH—R', or $CH_2=CH-(CH_2)_q-$ or $CH\equiv C-(CH_2)_q-$ group, and q=0 or 1, preferably 1, preferably an alkyl moiety, in particular methyl or acetyl moiety, and X, w, x, y, $R_8$ and R' are as defined above. It is preferable that Q in formula (IV) is H or a vinyl group ($CH_2=CH-$) or allyl group ($CH_2=CH-CH_2-$), preferably an allyl group, and X is respectively O. It is preferable that x+y in formula (III) is not equal to 0.

Suitable polyethers which have no carbonate group and which have a vinyl end group or ethynyl end group can also be produced by a process, known from the literature, of an alkaline alkoxylation of an alcohol having a vinyl group, in particular allyl alcohol, or with use of DMC catalysts as described in the prior art, for example in DE 10 2007 057145 A1.

The polysiloxane polyether copolymers according to the invention or the polysiloxane polyether copolymers produced by the process according to the invention can be used as foam stabilizers in the production of polyurethane foams. These processes can use the polysiloxane polyether copolymers alone or in the form of a composition. In some embodiments, preferred compositions comprise one or more polysiloxane polyether copolymers according to the invention, and a feature of these is that they also comprise one or more substances that can be used in the production of polyurethane foams, selected from polyol, nucleating agents, cell-size-reducing additives, cell openers, crosslinking agents, emulsifiers, flame retardants, antioxidants, antistatic agents, biocides, colour pastes, solid fillers, catalysts, in particular amine catalysts and/or metal catalysts, and buffer substances. In some embodiments, it can be advantageous if the composition used according to the invention comprises one or more solvents, preferably selected from glycols, alkoxylates or oils of synthetic and/or natural origin.

The production process for the polyurethane foams does not differ from the known processes except for the use of the polysiloxane polyether copolymers according to the invention, and it can therefore be carried out as described in the prior art.

Below is a list of patents which describe suitable components and processes for the production of the various types of flexible polyurethane foam, i.e., hot flexible polyurethane foams, high resilience polyurethane foams, and also ester-based flexible polyurethane foams, in which the polysiloxane polyether copolymers according to the invention can be used, and the entire content of this list is incorporated herein by way of reference: EP 0152878 A1; EP 0409035 A2; DE 102005050473 A1; DE 19629161 A1; DE 3508292 A1; DE 4444898 A1; EP 1061095 A1; EP 0532939 B1; EP 0867464 B1; EP1683831 A1; and DE102007046860 A1.

Further information concerning starting materials, catalysts, and also auxiliaries and additives that can be used is found, for example, in the Kunststoff-Handbuch [Plastics handbook], Volume 7, Polyurethane [Polyurethanes], Carl-Hanser-Verlag, Munich, 1st edition 1966, 2nd edition, 1983 and 3rd edition, 1993.

PU foams and their production are described in general terms, for example, in Ullmann's Encyclopedia of Industrial Chemistry, keyword Polyurethanes, Published Online: 15 Jan. 2005, DOI: 10.1002/14356007.a21_665.pub2, Wiley-VCH Verlag GmbH & Co. KGaA, Weinheim, and in the literature cited therein.

The polysiloxane polyether copolymers according to the invention, in particular those of formula (I), are particularly suitable for use as foam stabilizers in the production of, for example, hot or other flexible polyurethane foam, rigid polyurethane foam, ester-based polyurethane foam, viscoelastic flexible foam or else high resilience foam (HR foam). In some embodiments, the inventive polysiloxane polyether copolymers can be suitable for use as stabilizers for hot flexible polyurethane foam and for rigid polyurethane foam.

The polysiloxane polyether copolymers according to the invention are preferably used as stabilizers in processes for the production of polyurethane foam in which water or carbon dioxide is used as a blowing agent. However, other blowing agents that can be used in addition to, or instead of, water and/or $CO_2$ are blowing agents such as methylene chloride, pentane, alkanes, halogenated alkanes, acetone and/or cyclopentane. When $CO_2$ is used as a blowing agent, the $CO_2$ content in the blowing agent is preferably at least 5% by weight, with preference at least 50% by weight and with particular preference at least 80% by weight, based on the entirety of the blowing agents used.

When the polysiloxane polyether copolymers are used according to the invention in the production of the polyurethane foams, it can be advantageous if the polyols comprise, to some extent or exclusively, polyether carbonate polyols. These polyether carbonate polyols and their use are described, for example, in EP 2 287 226.

The use of the polysiloxane polyether copolymers according to the invention can provide polyurethane foams which comprise at least one of the inventive polysiloxane polyether copolymers.

The polyurethane foam according to the invention preferably comprises $CO_2$ as a blowing agent. In some embodiments, it is preferable that the $CO_2$ content, based on the entirety of the blowing agents present in the polyurethane foam or on the entirety of the constituents of the polyurethane foam that are gaseous at a pressure of 101 325 Pa and at a temperature of 23° C., is at least 5% by weight, preferably at least 50% by weight, and with preference at least 80% by weight.

With the polyurethane foam according to the invention it is possible to obtain items (i.e., articles of manufacture) which comprise the polyurethane foam or consist of a polyurethane foam of the present invention. These items can include, but are not limited to, furniture cushioning, refrigerator insulation, spray foams, metal-composite elements for (buildings) insulation, mattresses or automobile seats.

The polysiloxane polyether copolymers according to the invention can also be used in the production of polyurethane-based plastics, as surfactants for liquid-$CO_2$ extraction, as surfactant substance for dry cleaning or as emulsifier for cosmetic applications.

Examples are used below for further explanation of the subject matter of the present invention, but there is no intention that the subject matter of the invention be restricted to these examples of embodiments.

EXAMPLES

Example 1

Production of Polyethers Having Carbonate Structure 30.03 g of triethylene glycol, 47.3 g of diethyl carbonate and 0.1 g of butyl titanate were weighed into a single-necked flask and heated at reflux ($T_{oil}$=155° C.). Removal of distillate began after 2.5 hours. The distillate involved ethanol which was liberated during the reaction and which was discarded. Once distillation was complete, 20.4 g of allyloxyethanol and 0.1 g of butyl titanate were added and the mixture was again heated at reflux with an oil-bath temperature of 155° C. Once the further distillate produced had been removed, a vacuum of 300 to 500 mbar was applied and finally drying was completed at 20 mbar. The product was a yellowish-brownish liquid, which became clear after filtration through a round Weißband filter paper.

The molecular weights $M_n$ and $M_w$ were determined by gel permeation chromatography under the following measurement conditions: column combination SDV 1000/10 000 Å (length 65 cm), temperature 30° C., THF as mobile phase, flow rate 1 ml/min, specimen concentration 10 g/l, RI detector, evaluation against polypropylene glycol standard.

Appropriate polyethers could also have been synthesized by way of DMC catalysis. This method is prior art and can be found in the Patent EP2287226A1.

The polyethers used according to formula (III) in each case had Q=$CH_2$=CH—$CH_2$— and R'=—$CH_3$:
Polyether I: X=O, w=0, x=4, y=0, p=2, Y=O
Polyether II: X=O, w=0, x=5, y=0, p=2, Y=O
Polyether III: X=O, w=0, x=9, y=0, p=3, Y=O
Polyether IV: X=O, w=0, x=1, y=6, where R'=$CH_3$, p=4, Y=O
Polyether V: X=O, w=0, x=0, y=12, where R'=$CH_3$, p=0, R"—C(=O)—$CH_3$
Polyether VI: X=O, w=0, x=32, y=30, where R'=$CH_3$, p=0, R'=—C(=O)—$CH_3$ The hydrosiloxanes were produced as described in Example 1 according to the invention in EP 1439200 B1. The hydrosiloxanes used are defined as follows in accordance with formula (II).

R, $R_4$=$CH_3$, k=0, n=6.5, m=61.5

The polyethersiloxanes listed in Table 1 and Table 2 were produced as described in Example 7 in WO 2009/065644.

TABLE 1

Polyethersiloxanes used and percentage molar content of the polyethers used therein

| Stabilizer Ex. | according to the invention | PE I | PE II | PE III | PE IV | PE V | PE VI |
|---|---|---|---|---|---|---|---|
| 1 | yes | 15 | | | | 55 | 30 |
| 2 | yes | | 15 | | | 55 | 30 |
| 3 | yes | | | 15 | | 55 | 30 |
| 4 | yes | | | | 15 | 55 | 30 |

Example 2

Production of Polyurethane Foams by Manual Foaming Using Stabilizers Which Comprise Polyethers Having Carbonate Structure and Using a Comparative Stabilizer The following formulation was used for the production of the polyurethane foams: 100 parts by weight of polyetherol (hydroxy number=48 mg KOH/g, 11-12% EO), 5 parts by weight of water, 5 parts by weight of methylene chloride, 0.6 part by weight of the silicone stabilizers produced using inter alia the polyether polysiloxane examples given in Table 2 having carbonate structure, 0.15 part by weight of a tertiary amine, 64.2 parts by weight of T 80 toluene diisocyanate (Index 115) and also 0.23 part by weight of KOSMOS® 29 (Evonik Industries AG). The foam process used 300 g of polyol, and the amounts of the other formulation constituents were converted accordingly.

For the foaming process, the polyol, water, amine, tin catalyst and silicone stabilizer were thoroughly mixed, with stiffing. After addition of methylene chloride and isocyanate, the mixture was stirred with a stirrer for 7 sec. at 3000 rpm. The resultant mixture was poured into a paper-lined wooden box (basal area 27 cm×27 cm). This gave a foam, which was subjected to the performance tests described below.

Example 3

Production of Polyurethane Foams by $Co_2$ Foaming Using Stabilizers Which Comprise Polyethers Having Carbonate Structure and Using a Comparative Stabilizer The following formulation was used for the production of the polyurethane foams using $CO_2$ as a blowing agent: 100 parts by weight of polyetherol (hydroxy number=48 mg KOH/g), 6 parts by weight of water, 0.8 part by weight of silicone stabilizer, 0.11 part by weight of a tertiary amine (TEGOAMIN® B75 from Evonik Industries AG), 68.6 parts by weight of T 80 toluene diisocyanate (Index 105), and also 0.18 part by weight of KOSMOS® 29 (Evonik Industries AG) and 3.07 parts by weight of $CO_2$.

The foaming process was carried out with the aid of a NovaFlex system. Polyol output was set at 4500 g/min, and the amounts used of the other formulation constituents were converted accordingly.

A sieve set with four sieves was used, with permeability and hole size defined as follows: sieve I: 16% permeability with a hole size of 85μ, sieves II+III: 2.2% permeability with a hole size of 100μ, sieve IV: 23% permeability with a hole size of 100μ. The following other parameters should be noted: Creamer: 40 mm, gas loading: 10 NL nitrogen, mixer rotation rate: 2500 rpm, throttle pressure: 50 bar, removal time: about 3 seconds, lead time: 15 seconds.

Polyol, TDI and additives were fed into the mixing chamber. The mixer flew through a short tube into the discharge device ("creamer"). At the pressure sieves, the mixture was depressurized, and the $CO_2$ was discharged and formed the froth. The froth flew into a paper-lined foaming box of dimensions 26.5×26.5×26.5 cm. This gave a foam, which was subjected to the performance tests described below.

For comparison, foams were produced with use of a conventional stabilizer (TEGOSTAB® B 8228), which gave an irregular, relatively coarse cell structure in a foaming process with carbon dioxide as a blowing agent. It was thus possible to demonstrate unambiguously the improvement in the cell structure due to the use of carbonate-containing stabilizer structures.

Physical Properties of Foams

The foams produced were assessed on the basis of the following physical properties:

a) Full rise time:

Time difference between the pouring of the material mixture into the foaming box and the escape of the blowing gases from the polyurethane foam.

b) Amount by which the foam settles after the end of the rise phase (=settling):

Settling or after-rise was calculated from the difference between foam height after direct escape of the blowing gases and 3 min after the blowing gases had escaped from the foam. Foam height was measured by a needle attached to a centimeter scale, at the maximum in the centre of the convex upper surface of the foam.

c) Foam height:

The final height of the foam was determined by taking the settling or after-rise and subtracting or, respectively, adding this to the foam height after the blowing gases had escaped.

d) Air permeability/porosity:

The air-permeability or porosity of the foam was determined by measuring back pressure on the foam. The back pressure measured was stated in mm of alcohol column, and the lower back pressure values characterize a more open foam. The values were measured in the range from 0 to 300 mm e) Cell structure:

A horizontal slice of foam of thickness 0.8 cm was cut out 10 cm from the base of the foam body and was compared visually with five standard foam slices which have various qualities of cell structure. Grade 1 describes severe coarsening in particular in the edge region, while grade 5 indicates regular, fine cells.

f) Density (D):

This was determined as in ASTM D3574-08, the Test A, by measuring Core Density.

g) Froth

The material known as froth (foam immediately emerging from the mixing head) was assessed subjectively by the operator of the foaming process. The various categories for the froth can be found in Table 2 below:

TABLE 2

"Froth" assessment categories

| Category | Description | Fineness | Approximate bubble size in mm | Description |
|---|---|---|---|---|
| A | liquid/mixture rapidly flows to fill the box | 0/coarse | >2 | like bubble bath |

TABLE 2-continued

"Froth" assessment categories

| Category | Description | Fineness | Approximate bubble size in mm | Description |
|---|---|---|---|---|
| A | | 1/moderate | <2 | rather like beer head, not so stiff |
| A | | 2/fine | <0.5 | like liquid cream |
| B | moderate as A, but with higher viscosity | 0/coarse | >2 | like bubble bath |
| B | "corrugation" | 1/moderate | <2 | like beer head |
| B | | 2/fine | <0.5 | like liquid cream |
| C | stiff mixture forms layers of strips | 1/moderate | <2 | shaving foam with somewhat coarser bubbles |
| C | | 2/fine | <0.5 | shaving foam |
| D | stiff/"straggly" mixture forms layers of strips | 1/moderate | <2 | like over-whipped cream with somewhat coarser bubbles |
| D | | 2/fine | <0.5 | like over-whipped cream |

Bubble size (bubble diameter) was estimated visually. Category B2 represents the best froth assessment.

Table 3 collates the results of the manual foaming process.

TABLE 3

Results of foaming process for stabilizers 1 to 4 (manual foaming process) and standard TEGOSTAB ® B 8228 stabilizer (Ex. 0)

| Foam No. | Stabilizer | Full rise time [s] | Settling [cm] | Foam height [cm] | Air permeability [mm] |
|---|---|---|---|---|---|
| I | 0 | 81 | 0.8 | 32.5 | 21 |
| II | 1 | 80 | 2.6 | 30.6 | 8 |
| III | 2 | 79 | 2.4 | 30.8 | 7 |
| IV | 3 | 79 | 2.5 | 30.6 | 9 |
| V | 4 | 78 | 2.5 | 30.8 | 8 |

As can be seen from Table 3, when foam stabilizers which comprise polyethers having carbonate structure are used (Examples Nos. 1-4) in the normal manual foaming process, stable, open-cell foams are obtained.

Table 4 collates the results of the $CO_2$-foaming process.

TABLE 4

Results of the foaming process for foam examples a to e ($CO_2$-foaming process)

| Foam No. | Stabilizer | Settling [cm] | Froth [assessment] | Density [kg/m³] | Assessment |
|---|---|---|---|---|---|
| a | 0 | 1.2 | B2 | 15.8 | 1 |
| b | 1 | 1.1 | B2 | 14.9 | 1.5 |
| c | 2 | 1.2 | B2 | 14.4 | 3 |
| d | 3 | 1.2 | B2 | 14.7 | 2.5 |
| e | 4 | 1.7 | B2 | 14.7 | 3 |

The results of the $CO_2$-foaming process show that even the partial replacement of the polyethers by carbonate-containing structures leads to a significant improvement in cell structure. Indeed, foam examples c to e obtained an evaluation of 2-3, unlike a foam obtained by using a conventional stabilizer (TEGOSTAB® B8228), and from this it can be concluded that $CO_2$ introduced can be emulsified substantially more effectively, or that a stabilizer comprising carbonate structure substantially facilitates nucleation.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A polysiloxane polyether copolymer comprising at least one polyether moiety, wherein said polysiloxane polyether copolymer is a compound of formula (I):

$$R_1-\underset{R}{\underset{|}{Si}}-O-\left[\underset{R}{\underset{|}{Si}}-O\right]_n-\left[\underset{R_3}{\underset{|}{Si}}-O\right]_m-\left[\underset{\underset{\underset{\underset{R-Si-R}{|}}{\underset{|}{R_1}}}{\underset{O}{|}}}{\underset{\underset{\underset{R-Si-R}{|}}{O}}{\underset{|}{\left[R-Si-R_3\right]_{m^1}}}}\right]_k-\underset{R}{\underset{|}{Si}}-R_1$$ (I)

in which n and $n^1$ are mutually independently from 0 to 500, $(n+n^1) \leq 500$, m and $m^1$ are mutually independently from 0 to 60, $(m+m^1) \leq 60$, k=0 to 50;

R=identical or non-identical moieties selected from the group consisting of linear, cyclic or branched, aliphatic or aromatic, saturated or unsaturated hydrocarbon moieties having from 1 to 20 carbon atoms, —$CH_2$—$R^{IV}$, —$CH_2$—$CH_2$—$(O)_{x'}$—$R^{IV}$,

—$CH_2$—$CH_2$—$CH_2$—O—$CH_2$—CH(OH)—$CH_2OH$,

—$CH_2$—$\underset{H_2}{C}$—$\underset{H_2}{C}$—O—$\underset{H_2}{C}$—$\overset{H}{\underset{\diagdown\!\diagup}{\underset{O}{C}}}$—$CH_2$  and

—$CH_2$—$CH_2$—$CH_2$—O—$CH_2$—$C(CH_2OH)_2$—$CH_2$—$CH_3$, where x' is 0 or 1 and $R^{IV}$ is a hydrocarbon moiety having from 1 to 50 carbon atoms;

$R_1$ is mutually independently R or $R_3$ or $R_7$;

$R_2$ is mutually independently R or $R_3$ or $R_7$ or a functional, saturated or unsaturated, organic moiety substituted with heteroatoms;

$R_3$, being identical or different, is -$Q_l$-X—$(R_8X—)_w$—$(CH_2—CH_2O—)_x$—$(CH_2—CH(R')O—)_y$—$(C(O)—Y)_p$—R"

where l=0 or 1;

X=O;

Y=O;

$R^Z$=identical or different, H or alkyl moiety;

Q=divalent hydrocarbon moiety having from 2 to 6 carbon atoms;

$R_8$, being identical or different, is a branched or unbranched or cyclic, saturated or unsaturated hydrocarbon moiety having, between the heteroatoms X connected by the hydrocarbon moiety, a carbon chain comprising at least 2 carbon atoms;

w=0 to 200;

x=0 or from 5 to 140;

y=0 or from 5 to 140;

p=2 to 10;

provided that the sum $x+y \geq 5$;

where the units provided with the indices w, x, y and p can have blockwise or random arrangement;

R'=identical or different alkyl or aryl group having a total of from 1 to 12 carbon atoms;

R"=is a —C(O)—R''' group, where R''' is selected from the group consisting of an alkyl moiety, a —$CH_2$—O—R' group, and alkylaryl group;

and $R_7$=crosslinking agent moiety;

with the proviso that at least one moiety $R_3$ is present in which the index p>0.

2. The polysiloxane polyether copolymer according to claim 1, wherein n and $n^1$ are mutually independently from 3 to 147 and $(n+n^1) \leq 150$, k is 0 or from 1 to 5, $R_1$=R or $R_3$, as set forth below, $R_2$=R or $R_3$, as set forth below, or a chloropropyl, vinyl or methacryloxypropyl moiety, wherein at least one moiety $R_3$, being identical or different, is -$Q_l$-X—$(R_8X—)_w$—$(CH_2—CH_2O—)_x$—$(CH_2—CH(R')O—)_y$—$(C(O)—Y)_p$—R", where l=0 or l=1 and Q=—$CH_2$—$CH_2$—$CH_2$—;

R=a methyl moiety;

$R_8$=a linear hydrocarbon moiety —$C_jH_{2j}$—, where j=4 to 12;

w=0 or from 1 to 100;

x=0 or from 5 to 140;

y=0 or from 5 to 140;

p=from 2 to 10;

provided that the sum $x+y \geq 5$; and

R'=identical or different, a phenyl, methyl or ethyl group, and R" is an acetyl moiety, with the proviso that at least one moiety $R_3$ is present.

3. A method of producing polyurethane foams, comprising reacting at least one polyol and at least one isocyanate compound in the presence of at least one polysiloxane polyether copolymer according to claim 1.

4. The method according to claim 3, further comprising $CO_2$ as a blowing agent.

5. The method according to claim 4, wherein said at least one polyol is a polyether carbonate polyol.

6. A polyurethane foam comprising at least one polysiloxane polyether copolymer according to claim 1.

* * * * *